H. S. GIPE & A. M. KUHNS.
APPARATUS FOR WEIGHING AND TESTING MILK.
APPLICATION FILED DEC. 27, 1915.

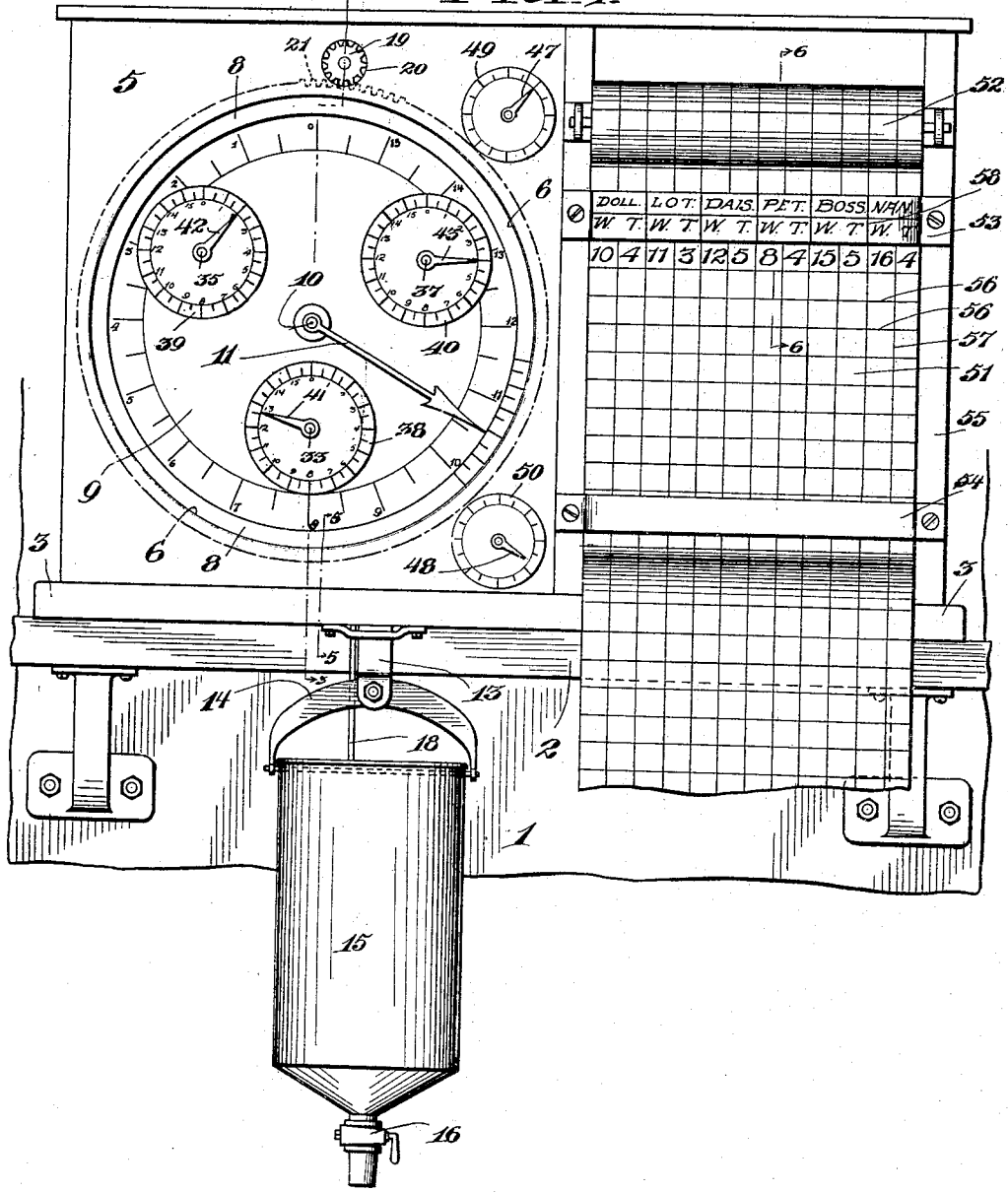

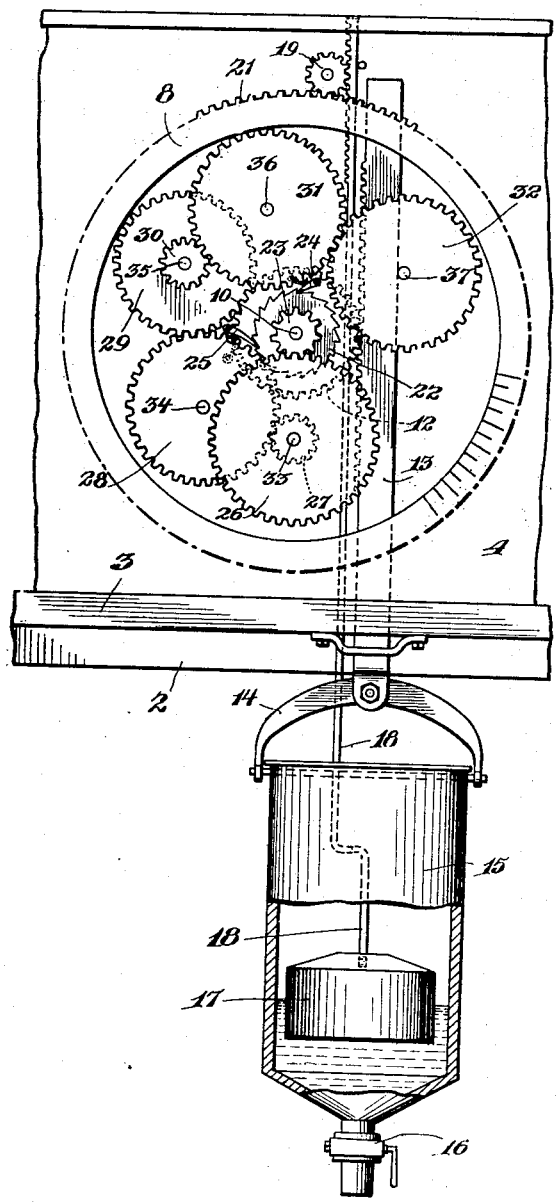
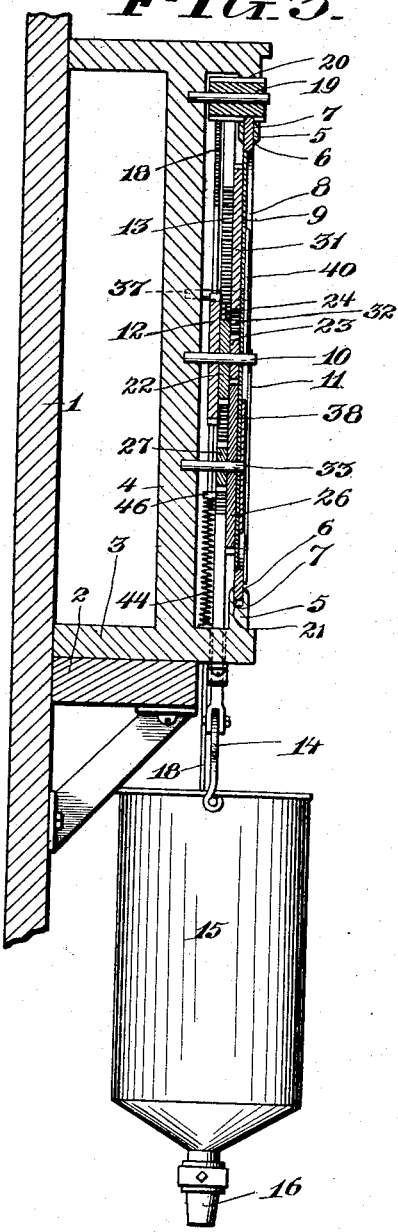

1,205,986.

Patented Nov. 28, 1916.
3 SHEETS—SHEET 3.

Inventors
Harrison S. Gipe
Amos M. Kuhns,
By Joshua R. H. Potts
their Attorney

Witnesses
Wm. Reonway.
C. R. Ziegler.

UNITED STATES PATENT OFFICE.

HARRISON S. GIPE, OF PALMYRA, AND AMOS M. KUHNS, OF UNION DEPOSIT, PENNSYLVANIA.

APPARATUS FOR WEIGHING AND TESTING MILK.

1,205,986.  Specification of Letters Patent.  Patented Nov. 28, 1916.

Application filed December 27, 1915. Serial No. 68,861.

*To all whom it may concern:*

Be it known that we, HARRISON S. GIPE and AMOS M. KUHNS, citizens of the United States, residing, respectively, at Palmyra, county of Lebanon and State of Pennsylvania, and Union Deposit, county of Dauphin and State of Pennsylvania, have invented certain new and useful Improvements in Apparatus for Weighing and Testing Milk, of which the following is a specification.

Our invention relates to improvements in apparatus for weighing and testing milk, the object of the invention being to provide an apparatus which will record the weight and the specific gravity, the latter indicating the richness of the milk.

It is a well known fact that milk of the same weight varies in volume in accordance with its richness, and it is the purpose of our apparatus to simultaneously weigh the milk and indicate the specific gravity or richness, permitting a record to be kept.

While our apparatus is particularly adapted for use on dairy farms where a record of the milk of each cow can be kept, it is not limited in this respect, but is capable of a wide range of usefulness, either for milk or other material which can receive like treatment.

With these and other objects in view, the invention consists in certain novel features of construction and combinations and arrangements of parts as will be more fully hereinafter described and pointed out in the claims.

Figure 4:
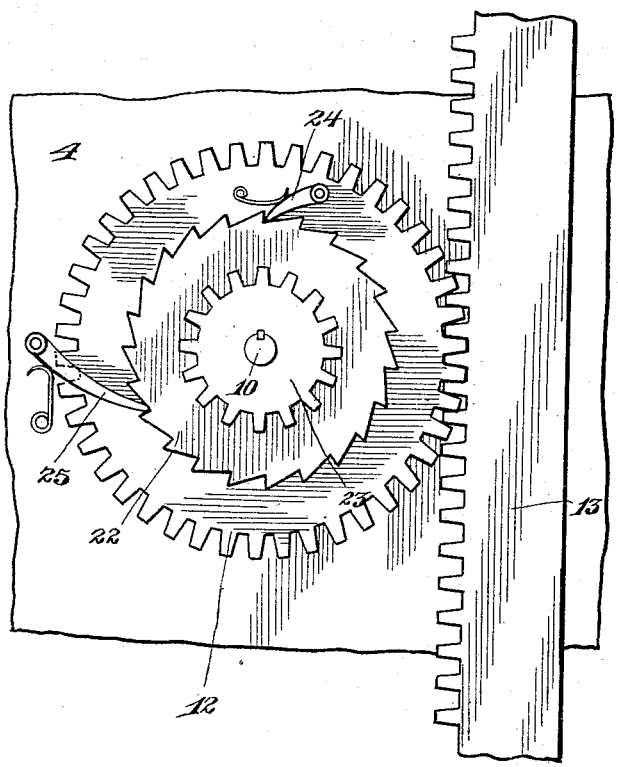
Figure 5:
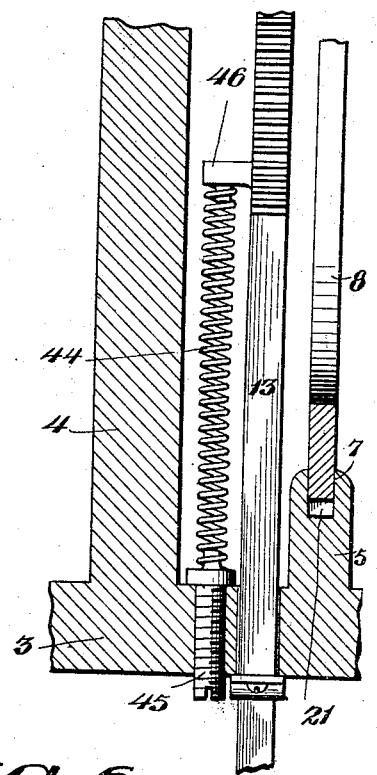
Figure 6:
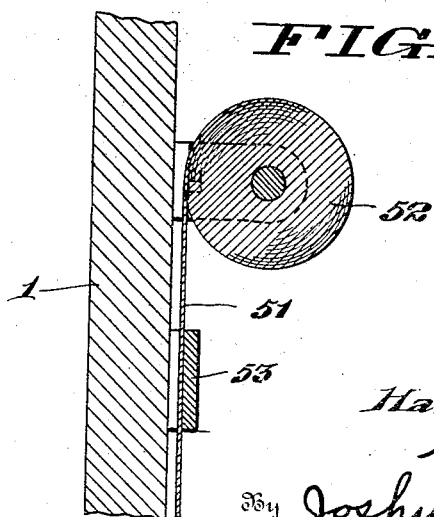

In the accompanying drawings: Figure 1 is a view in front elevation illustrating our improved apparatus. Fig. 2 is a view in front elevation with the front plate, main dial and other details removed to illustrate the train of gearing. Fig. 3 is a view in section on the line 3—3 of Fig. 1. Fig. 4 is an enlarged detail view illustrating the rack bar and parts driven thereby. Fig. 5 is an enlarged fragmentary view in section on the line 5—5 of Fig. 1, and Fig. 6 is a similar view in section on the line 6—6 of Fig. 1.

1 represents a wall having a shelf 2 thereon supporting the casing 3 of our improved apparatus. This casing 3 has a relatively heavy backing board 4 and a front board 5, the latter having a circular opening 6 therein, and provided in the wall of said opening with a groove 7 in which our improved dial ring 8 is mounted to turn.

A stationary dial 9 is located inside of the dial ring, and is held against movement by the shafts projecting through the same, which will be hereinafter described.

10 is a central main shaft which projects through the stationary dial 9, and is provided on its outer end with a pointer 11 which registers with stationary dial 9, and also with the movable ring dial 8 as will be explained.

A relatively large pinion 12 is loose on shaft 10, and meshes with a vertically positioned rack bar 13, the latter having a bail 14 at its lower end supporting a receptacle 15 for milk or other material to be measured.

An outlet valve 16 is provided in the lower end of the receptacle to empty the latter, and a float 17 is provided in the receptacle and secured to the lower end of a rack bar 18. This rack bar 18 projects up through the casing 3, and meshes with a relatively long pinion 19, the latter projecting through an opening 20 in the casing front 5 and meshing with teeth 21 on the periphery of dial ring 8.

On the main shaft 10, a ratchet wheel 22 and a pinion 23 are keyed or otherwise secured. A spring-pressed pawl 24 carried by pinion 12 engages the ratchet wheel 22, and a second spring-pressed pawl 25 connected to the casing 3 also engages ratchet wheel 22, and permits the turning movement of said ratchet wheel and shaft 10 in one direction only.

The pinion 23 drives a gear train consisting of gears 26, 27, 28, 29, 30, 31, and 32, supported on shafts 33, 34, 35, 36, and 37 in casing 3. The shafts 33, 35, and 37 project through the centers of dials 38, 39, and 40 respectively, which are made on the face of dial 9.

Pointers 41, 42, and 43 are secured on the shafts 33, 35, and 37 respectively, and register with the dials 38, 39, and 40 respectively so as to indicate the weight of the milk and show the total at all times. In view of the fact that we weigh the milk, these several dials 38, 39, and 40 are divided into sixteenths, which is a convenient division, although we do not limit ourselves in this particular.

The rack bar 13 is maintained in an elevated position and returned to such position by means of a coiled spring 44. This coiled spring is supported on an adjusting screw 45 in the bottom of casing 3, and exerts upward pressure against a lug 46 on rack bar 13.

By means of the screw 45, the tension of the spring can be adjusted so as to nicely balance the weight of the rack bar 13, and receptacle 15, and permit the accurate weighing of the milk as will now be explained.

When the milk is poured into receptacle 15, it causes the downward movement of the receptacle, and rack bar 13 is drawn downwardly against the tension of spring 44. This downward movement of the rack bar 13 causes the pinion 12 to turn in a direction to cause the pawl 24 to ride over the teeth of ratchet wheel 22, while the ratchet wheel is held against turning movement by pawl 25.

The float 17 assumes its position in the receptacle in accordance with the volume of the milk, and in doing so, causes a downward longitudinal movement of rack bar 18, which imparts a rotary movement to pinion 19, and the latter turns the ring dial 28.

When the milk is permitted to flow from receptacle 15 through the valve 16 in the bottom of the latter, the spring 44 moves the rack bar 13 upwardly, causing pinion 12 to turn, and through the medium of pawl 24 turns ratchet wheel 20 and shaft 10. This turning movement of shaft 10 imparts movement to the gear train consisting of gears 23, 26, 27, 28, 29, 30, 31 and 32.

The turning movement of shaft 10 moves the pointer 11 so that it indicates the weight of the milk on the stationary dial 9, and through the medium of the gear train above described, causes the shafts 33, 35, and 37 to turn and add to the total as indicated by the pointers 41, 42 and 43.

As above stated, the location of the float 17 in the receptacle 15 determines the position of the ring dial 8 as the rack bar 18 and pinion 20 cause said ring dial to turn. This ring dial turns in the same direction as the pointer 11 is moved, so that the pointer 11 not only registers with the fixed scale 9 to indicate the weight of the milk, but also registers with the scale on the ring dial to indicate the richness or specific gravity of the milk which measurement we term "test" to distinguish it from "weight."

On the front plate 5 of casing 3, hand operated pointers 47 and 48 are provided, registering with dials 49 and 50, so that the operator can relieve his mind of the burden of remembering certain figures.

In connection with the weighing and testing apparatus above described, we preferably employ a record sheet 51 which is supported on a roller 52, and is drawn from the roll and located back of cross bars 53 and 54 on a frame 55. The record sheet 51 is ruled longitudinally and horizontally as shown at 56 forming spaces 57, and one of the cross bars 53 is divided by lines 58 which register with the longitudinal lines of the record sheet.

Between the lines 58, certain printed matter is provided. This printed matter consists of the names of the cows and also the initials "W" and "T" indicating "Weight" and "Test," so that the operator can, on the record sheet 51, keep an accurate record of the weight and test of the milk given by each cow. As the sheet is used, it can be drawn downwardly, so that other spaces can be exposed for use.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. In an apparatus of the character described, the combination with two dials, and a single pointer registering with both dials, of weighing means operating the pointer, and measuring means for engagement with the material to be weighed and operatively connected with and to move one of said dials with respect to the other of said dials, substantially as described.

2. In an apparatus of the character described, the combination with a stationary dial, and a movable ring dial, of a pointer registering with both dials, weighing mechanism controlling the movement of the pointer, and measuring mechanism controlling the movement of the ring dial, and including a member for engagement with the material to be weighed, substantially as described.

3. In an apparatus of the character described, the combination with a stationary dial, and a movable ring dial, of a pointer registering with both dials, weighing mechanism controlling the movement of the pointer, measuring mechanism controlling the movement of the ring dial, and including a member for engagement with the material to be weighed and totaling indicators operated by the weighing mechanism, substantially as described.

4. In an apparatus of the character described, the combination with a stationary dial, and a movable ring dial, of a pointer registering with both dials, weighing mechanism controlling the movement of the pointer, measuring mechanism controlling the movement of the ring dial, and including a member for engagement with the material to be weighed, totaling indicators operated by the weighing mechanism, said totaling indicators on the face of the stationary dials, substantially as described.

5. In an apparatus of the character described, the combination with a stationary dial, of a shaft projecting through the center of the stationary dial, a pointer secured to the shaft registering with said dial, a ratchet wheel secured to said shaft, a pinion loose on the shaft, a pawl carried by the pinion and meshing with the teeth of the ratchet wheel, a second pawl engaging the teeth of the ratchet wheel and holding the latter against movement in one direction, a vertically positioned rack bar meshing with the pinion, a spring exerting upward pressure on the rack bar, and a receptacle supported by the rack bar, substantially as described.

6. In an apparatus of the character described, the combination with a stationary dial, of a shaft projecting through the center of the stationary dial, a pointer on the shaft registering with said dial, a ratchet wheel secured to said shaft, a pinion loose on the shaft, a pawl carried by the pinion and meshing with the teeth of the ratchet wheel, a second pawl engaging the teeth of the ratchet wheel and holding the latter against movement in one direction, a vertically positioned rack bar meshing with the pinion, a spring exerting upward pressure on the rack bar, a receptacle supported by the rack bar, a ring dial movably mounted around the outer edge of the stationary dial, and having teeth on its periphery, a pinion meshing with the teeth on the ring dial, a rack bar engaging the last-mentioned pinion, and a float secured to the last-mentioned rack bar and located in the receptacle, substantially as described.

7. In an apparatus of the character described, the combination with means for indicating weight, and means co-active with said weight-indicating means operative to establish the specific gravity of the material which is weighed, of a record sheet having crossed lines thereon forming spaces, and a bar containing the names of cows and captions registering with the spaces, substantially as described.

In testimony whereof we have signed our names to this specification in the presence of two subscribing witnesses.

HARRISON S. GIPE.
AMOS M. KUHNS.

Witnesses:
J. B. SWOPE,
LILLIE M. McLANIGAN.

Copies of this patent may be obtained for five cents each, by addressing the "Commissioner of Patents, Washington, D. C."